United States Patent
Hsieh

(10) Patent No.: US 11,945,941 B2
(45) Date of Patent: Apr. 2, 2024

(54) FLUORINE-CONTAINING RESIN COMPOSITION AND ARTICLE MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 133 days.

(21) Appl. No.: 17/724,311

(22) Filed: Apr. 19, 2022

(65) Prior Publication Data
US 2023/0279210 A1   Sep. 7, 2023

(30) Foreign Application Priority Data

Mar. 2, 2022   (TW) .................................. 111107497

(51) Int. Cl.
| | |
|---|---|
| *C08L 27/18* | (2006.01) |
| *C08K 3/36* | (2006.01) |
| *C08L 29/14* | (2006.01) |
| *C09D 127/18* | (2006.01) |
| *C08K 3/22* | (2006.01) |
| *C08K 3/38* | (2006.01) |

(52) U.S. Cl.
CPC ............ *C08L 27/18* (2013.01); *C09D 127/18* (2013.01); *C08K 2003/2241* (2013.01); *C08K 2003/382* (2013.01); *C08L 2205/025* (2013.01); *C08L 2205/035* (2013.01)

(58) Field of Classification Search
None
See application file for complete search history.

(56) References Cited

FOREIGN PATENT DOCUMENTS

CN   107434945   * 12/2017

\* cited by examiner

*Primary Examiner* — David J Buttner
(74) *Attorney, Agent, or Firm* — Muncy. Geissler, Olds & Lowe, P.C.

(57) ABSTRACT

A resin composition includes 100 parts by weight of a fluorine-containing compound, which includes tetrafluoroethylene homopolymer, perfluoroalkoxy alkane polymer or a combination thereof; 2 parts by weight to 6 parts by weight of a butyral copolymer, which includes a unit of Formula (I), a unit of Formula (II) and a unit of Formula (III), wherein 1 is an integer of 40 to 250, m is an integer of 5 to 380, n is an integer of 55 to 2500, and wherein the butyral copolymer has a content of hydroxyl group of 21 mol % to 80 mol %; and 20 parts by weight to 150 parts by weight of an inorganic filler. The resin composition may achieve improvements in at least one of the following properties of the article made therefrom including dielectric constant, dissipation factor, X-axis coefficient of thermal expansion, weight loss percentage, tensile strength and comparative tracking index.

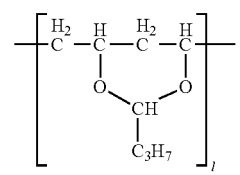

Formula (I)

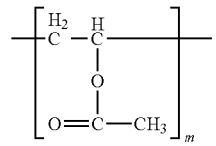

Formula (II)

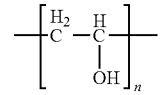

Formula (III)

14 Claims, No Drawings

FLUORINE-CONTAINING RESIN COMPOSITION AND ARTICLE MADE THEREFROM

CROSS-REFERENCE TO RELATED APPLICATION

This application claims the priority benefits of Taiwan Patent Application No. 111107497, filed on Mar. 2, 2022. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a plastic sheet, a resin film, a laminate or a printed circuit board.

2. Description of Related Art

Conventional insulation materials for circuit laminates include epoxy resins, polyphenylene ether resins, fluororesins and so on. Generally, fluororesin materials have the lowest dielectric constant and dissipation factor among all insulation materials, so circuit boards made from the fluororesin materials can be applied to high frequency and high speed transmission purposes such as antenna, automobile radar, radio frequency device, 5G millimeter wave transmission device and the like. However, circuit boards made from the conventional fluororesin materials such as polytetrafluoroethylene have to be subject to lamination at an extremely high temperature and pressure, require stringent processing conditions, and have several drawbacks such as poor operability and insulation property, etc. Accordingly, there is a need to develop a resin composition which may overcome the problems described above.

SUMMARY

To overcome the problems facing prior arts, particularly one or more above-mentioned technical problems of conventional materials, it is a primary object of the present disclosure to provide a resin composition and an article made therefrom which may overcome at least one of the above-mentioned technical problems.

To achieve the above-mentioned objects, the present disclosure provides a resin composition, comprising:

100 parts by weight of a fluorine-containing compound, which comprises tetrafluoroethylene homopolymer, perfluoroalkoxy alkane polymer or a combination thereof;

2 parts by weight to 6 parts by weight of a butyral copolymer, which comprises a unit of Formula (I), a unit of Formula (II) and a unit of Formula (III), wherein l is an integer of 40 to 250, m is an integer of 5 to 380, n is an integer of 55 to 2500, and wherein the butyral copolymer has a content of hydroxyl group of 21 mol % to 80 mol %;

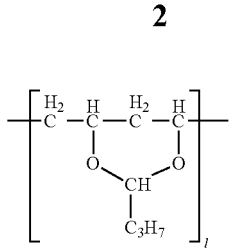

Formula (I)

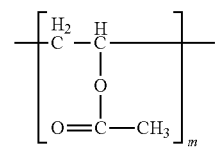

Formula (II)

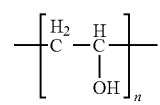

Formula (III)

and 20 parts by weight to 150 parts by weight of an inorganic filler.

For example, in one embodiment, the tetrafluoroethylene homopolymer is tetrafluoroethylene homopolymer powder of average particle size of 0.15 μm to 0.40 μm dispersed in aqueous solution, and the perfluoroalkoxy alkane polymer is perfluoroalkoxy alkane polymer powder of average particle size of 0.15 μm to 0.50 μm dispersed in aqueous solution.

For example, in one embodiment, the resin composition further comprises solid powder of tetrafluoroethylene homopolymer of average particle size of 20 μm to 50 μm. For example, in one embodiment, relative to 100 parts by weight of the fluorine-containing compound, the solid powder of tetrafluoroethylene homopolymer is 3 parts by weight to 8 parts by weight.

For example, in one embodiment, the perfluoroalkoxy alkane polymer comprises a copolymer of tetrafluoroethylene and perfluoroalkyl vinyl ether.

For example, in one embodiment, the inorganic filler comprises silica, titanium dioxide, sintered body formed by aluminum nitride and boron nitride or a combination thereof.

For example, in one embodiment, the resin composition further comprises surfactant, silane coupling agent, impregnation aid, solvent or a combination thereof.

To achieve the above-mentioned objects, the present disclosure further provides an article made from the resin composition, including a plastic sheet, a resin film, a laminate or a printed circuit board.

For example, in one embodiment, articles made from the resin composition disclosed herein have one, more or all of the following properties:

a dielectric constant as measured by reference to JIS C2565 at 10 GHz of less than or equal to 3.15;

a dissipation factor as measured by reference to JIS C2565 at 10 GHz of less than or equal to 0.0015;

an X-axis coefficient of thermal expansion as measured by reference to IPC-TM-650 2.4.24.5 of less than or equal to 30 ppm/° C.;

a weight loss percentage of less than or equal to 2.5%;

a tensile strength as measured by reference to ASTM D3039 of greater than or equal to 700 MPa; and a comparative tracking index as measured by reference to ASTM D3638 of greater than or equal to 600 V.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer.

Unless otherwise specified, the term "resin" is a widely used common name of a synthetic polymer and is construed in the present disclosure as comprising monomer and its combination, polymer and its combination or a combination of monomer and its polymer, but not limited thereto.

For example, in the present disclosure, the term "vinyl-containing" is construed to encompass the inclusion of a vinyl group, a vinylene group, an allyl group, a (meth) acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

Unless otherwise specified, according to the present disclosure, when the term acrylate or acrylonitrile is expressed as (meth)acrylate or (meth)acrylonitrile, it is intended to comprise both situations of containing and not containing a methyl group; for example, poly(meth)acrylate is construed as including polyacrylate and polymethacrylate. For example, (meth)acrylonitrile is construed as including acrylonitrile and methacrylonitrile.

Unless otherwise specified, an alkyl group and an alkenyl group described herein are construed to encompass various isomers thereof. For example, a propyl group is construed to encompass n-propyl and iso-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the fluorine-containing compound may represent 100 kilograms of the fluorine-containing compound or 100 pounds of the fluorine-containing compound.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, the present disclosure provides a resin composition, comprising:
  100 parts by weight of a fluorine-containing compound, which comprises tetrafluoroethylene homopolymer, perfluoroalkoxy alkane polymer or a combination thereof;
  2 parts by weight to 6 parts by weight of a butyral copolymer, which comprises a unit of Formula (I), a unit of Formula (II) and a unit of Formula (III), wherein 1 is an integer of 40 to 250, m is an integer of 5 to 380, n is an integer of 55 to 2500, and wherein the butyral copolymer has a content of hydroxyl group of 21 mol % to 80 mol %;

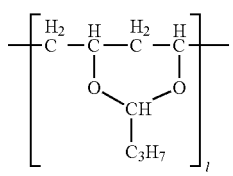

Formula (I)

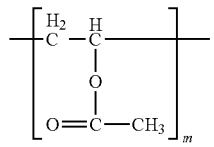

Formula (II)

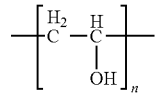

Formula (III)

and
  20 parts by weight to 150 parts by weight of an inorganic filler.

In the resin composition of the present disclosure, the fluorine-containing compound may by selected from the group consisting of tetrafluoroethylene homopolymer, perfluoroalkoxy alkane polymer or a combination thereof. Tetrafluoroethylene homopolymer is a polymer obtained by subjecting tetrafluoroethylene to a homopolymerization reaction, which can also be called polytetrafluoroethylene. Perfluoroalkoxy alkane polymer is a polymer obtained by subjecting tetrafluoroethylene and perfluoroether to a copolymerization reaction, such as but not limited to a copolymer of tetrafluoroethylene and perfluoroalkyl vinyl ether.

For example, in one embodiment, the fluorine-containing compound is present in the form of dispersion rather than solid powder in the resin composition of the present disclosure. In other words, the fluorine-containing compound comprises fluorine-containing compound powder dispersed in aqueous solution.

For example, in one embodiment, the fluorine-containing compound comprises tetrafluoroethylene homopolymer, perfluoroalkoxy alkane polymer or a combination thereof, wherein the tetrafluoroethylene homopolymer is tetrafluoroethylene homopolymer powder of average particle size of 0.15 μm to 0.40 μm dispersed in aqueous solution, and the perfluoroalkoxy alkane polymer is perfluoroalkoxy alkane polymer powder of average particle size of 0.15 μm to 0.50 μm dispersed in aqueous solution. For example, in one embodiment, tetrafluoroethylene homopolymer of average particle size of 0.15 μm or tetrafluoroethylene homopolymer of average particle size of 0.40 μm is used in the resin composition disclosed herein, wherein the properties of articles made therefrom are the same or equivalent to those of the resin composition replaced with tetrafluoroethylene homopolymer of average particle size of 0.22 μm. For example, in one embodiment, perfluoroalkoxy alkane polymer of average particle size of 0.15 μm or perfluoroalkoxy alkane polymer of average particle size of 0.50 μm is used in the resin composition disclosed herein, wherein the properties of articles made therefrom are the same or equivalent to those of the resin composition replaced with perfluoroalkoxy alkane polymer of average particle size of 0.20 μm.

For example, in one embodiment, the aforesaid tetrafluoroethylene homopolymer may comprise tetrafluoroethylene homopolymer solid powder, tetrafluoroethylene homopolymer dispersion or a combination thereof, wherein the tetrafluoroethylene homopolymer dispersion is a solution formed by tetrafluoroethylene homopolymer solid powder, solvent and dispersing agent. In some embodiments, any one or more of the following commercial tetrafluoroethylene homopolymers may be used: DISP 30, DISP 33 or DISP 40 available from Chemours Company, or D-110, D-210, D-210C, D-411, D-711 or D-310 available from Daikin industries, Ltd.

For example, in one embodiment, the aforesaid perfluoroalkoxy alkane polymer comprises a copolymer of tetrafluoroethylene and perfluoroalkyl vinyl ether. For example, PFAD 335D available from Chemours Company can be used as the perfluoroalkoxy alkane polymer.

In the resin composition of the present disclosure, the aforesaid butyral copolymer comprises a unit of Formula (I), a unit of Formula (II) and a unit of Formula (III), wherein 1 is an integer of 40 to 250, m is an integer of 5 to 380, and n is an integer of 55 to 2500. In other words, any compound polymerized by a unit of Formula (I), a unit of Formula (II) and a unit of Formula (III) with the number of repeating units meeting the scope of 1, m and n falls within the scope of the butyral copolymer described above, regardless of what the order or the arrangement relationship of the unit of Formula (I), the unit of Formula (II) and the unit of Formula (III) is.

In the resin composition of the present disclosure, the aforesaid butyral copolymer comprises 40 to 250 units of Formula (I), 5 to 380 units of Formula (II) and 55 to 2500 units of Formula (III), and there is no limitation to the order or the arrangement relationship of the three kinds of units.

In addition, in the resin composition of the present disclosure, the aforesaid butyral copolymer has a content of hydroxyl group of 21 mol % to 80 mol %. In other words, the content of the unit of Formula (III) is 21 mol % to 80 mol % relative to the total content of the unit of Formula (I), the unit of Formula (II) and the unit of Formula (III).

In the resin composition of the present disclosure, the inorganic filler may be any inorganic fillers known in the art. The inorganic filler suitable for the present disclosure is not particularly limited and may comprise any one or more commercially available products, self-prepared products or a combination thereof. In some embodiments, any one or more of the following inorganic fillers may be used: silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, calcined kaolin, hollow porous particle, zirconium tungstate, polytetrafluoroethylene (PTFE) powder, sintered body formed by aluminum nitride and boron nitride, or a combination thereof. Moreover, the inorganic filler can be spherical, fibrous, plate-like, particulate, flake-like or whisker-like.

For example, in one embodiment, the aforesaid inorganic filler comprises silica, titanium dioxide, sintered body formed by aluminum nitride and boron nitride or a combination thereof.

In addition to the components described above, for example, in one embodiment, the resin composition disclosed herein may further optionally comprise other additives such as but not limited to tetrafluoroethylene homopolymer solid powder, such as tetrafluoroethylene homopolymer solid powder of average particle size of 20 μm to 50 μm. The amount of tetrafluoroethylene homopolymer solid powder is not particularly limited, for example, in one embodiment, relative to 100 parts by weight of the fluorine-containing compound, the tetrafluoroethylene homopolymer solid powder is 3 parts by weight to 8 parts by weight. For example, in one embodiment, the resin composition disclosed herein is further added with tetrafluoroethylene homopolymer solid powder of average particle size of 20 μm or with tetrafluoroethylene homopolymer solid powder of average particle size of 50 μm, wherein the properties of articles made therefrom are the same or equivalent to those of the resin composition replaced with tetrafluoroethylene homopolymer solid powder of average particle size of 38 μm.

In addition to the components described above, for example, in one embodiment, the resin composition disclosed herein may optionally further comprise surfactant, silane coupling agent, impregnation aid, solvent or a combination thereof. Unless otherwise specified, the components described above should be construed as including their modifications. For example, in one embodiment, relative to 100 parts by weight of the fluorine-containing compound, the amount of any component described above may range from 0.01 part by weight to 300 parts by weight, such as but not limited to 0.01 part by weight to 3 parts by weight, 30 parts by weight to 80 parts by weight or 50 parts by weight to 300 parts by weight, preferably 150 parts by weight to 260 parts by weight.

For example, in one embodiment, the surfactant (a.k.a. dispersing agent) may be any surfactants known in the art. The surfactant suitable for the present disclosure is not particularly limited and may comprise any one or more commercially available products, self-prepared products or a combination thereof. In some embodiments, any one or more of the following surfactants may be used: surfactants available from Chemours Company, surfactants available from Daikin industries, Ltd., HEXAFOR 601 to 695 series surfactants available from MAFLON, Futergent series 212M fluorine-containing surfactant available from NEOS, Triton X-100 surfactant available from Emperor Chemical Co., Ltd., fluorine-based functional coating agent available from Voyage Material Limited, FC-4430 fluorine-containing surfactant available from 3M, or a combination thereof. For example, in one embodiment, relative to 100 wt % of the dispersion, the content of the surfactant described above may be 0.5 wt % to 5.0 wt %, preferably 0.9 wt % to 4.0 wt %.

Unless otherwise specified, relative to 100 parts by weight of the fluorine-containing compound, in the resin composition of the present disclosure, the amount of the surfactant described above is not particularly limited and may range from 1 part by weight to 12 parts by weight, preferably 2 parts by weight to 9 parts by weight.

For example, the silane coupling agent may be any silane coupling agents known in the art. The silane coupling agent suitable for the present disclosure is not particularly limited and may comprise any one or more commercially available products, self-prepared products or a combination thereof. In some embodiments, any one or more of the following silane coupling agents available from Shin-Etsu Chemical Co., Ltd. may be used: vinyl-containing silane coupling agent, such as but not limited to KBM-1003; styryl-containing silane coupling agent, such as but not limited to KBM-1403; methacryloxy-containing silane coupling agent, such as but not limited to KBM-503; epoxy-containing silane coupling agent, such as but not limited to KBM-403; and amino-containing silane coupling agent, such as but not limited to KBM-903 or KBM-573. The amount of the silane coupling agent is not particularly limited and may be adjusted according to the dispersivity of inorganic filler used in the resin composition.

For example, in one embodiment, the inorganic filler may be optionally pre-treated with a silane coupling agent so as to adhere the silane coupling agent on the surface of the inorganic filler to obtain the inorganic filler pre-treated with the silane coupling agent to be added to the resin composition disclosed herein.

For example, the impregnation aid may be various impregnation aids known in the art, such as but not limited to: cellulose-based impregnation aid, ester-based impregnation aid, alcohol-based impregnation aid, polyoxyethylene ether, sodium alkylbenzenesulfonate or a combination thereof. The cellulose-based impregnation aid may comprise such as methylcellulose, ethylcellulose, hydroxymethylcellulose, hydroxyethylcellulose, hydroxypropylcellulose, hydroxypropyl methylcellulose, carboxymethyl cellulose, nitrocellulose or a combination thereof. The polyoxyethylene ether may comprise such as nonylphenol polyoxyethylene ether, but not limited thereto.

For example, in one embodiment, the solvent may comprise water (deionized water, pure water, reverse osmosis water, distilled water, etc.), methanol, ethanol or a mixture thereof, but not limited thereto. The amount of solvent is not particularly limited and may be adjusted according to the viscosity required for the resin composition. For example, in one embodiment, the resin composition disclosed herein may use water as the sole solvent.

The resin compositions of various embodiments of the present disclosure may be processed by various methods into different articles, including but not limited to a plastic sheet, a resin film, a laminate or a printed circuit board.

For example, the resin compositions of the present disclosure may be used to make a plastic sheet. For example, according to the present disclosure, the article made from thermoplastic resin impregnated with reinforcement materials is called plastic sheet. For example, in one embodiment, components of the resin composition are added to a stirred tank, stirred homogeneously and well mixed to obtain a dispersion, which is then loaded to the impregnation tank. The reinforcement material is immersed in the impregnation tank to adhere the resin composition on the reinforcement material, followed by baking to cure and form the resin composition on the reinforcement material so as to obtain a plastic sheet. One or more impregnation and baking processes may be performed as needed, which can also obtain a plastic sheet. For example, 2 to 5 times of the impregnation and baking processes may be repeated to obtain a plastic sheet having a desired thickness.

For example, the plastic sheet disclosed herein has a reinforcement material and a layered structure formed thereon, wherein the layered structure is formed by heating to melt the aforesaid resin composition at high temperature. The baking temperature for making the plastic sheet disclosed herein may be divided into a drying section of 90° C. to 150° C., a baking section of 200° C. to 300° C. and a sintering section of 350° C. to 400° C., wherein each heating section may be optionally maintained for 3 to 30 minutes.

The reinforcement material may be any one of woven fabric and non-woven fabric, and the woven fabric may comprise fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. The non-woven fabric comprises liquid crystal polymer non-woven fabric and fluorine-containing non-woven fabric; the liquid crystal polymer non-woven fabric may be such as polyester non-woven fabric, polyurethane non-woven fabric and so on, but not limited thereto. The woven fabric may also comprise liquid crystal polymer woven fabric and fluorine-containing woven fabric, such as polyester woven fabric, polyurethane woven fabric and so on, but not limited thereto. The reinforcement material may increase the mechanical strength of the plastic sheet. In one preferred embodiment, the reinforcement material can be optionally pre-treated by a silane coupling agent.

For example, in one embodiment, the article made from the resin composition disclosed herein may be a resin film. Components of the resin composition were added to a stirred tank, stirred homogeneously and well mixed to obtain a dispersion, which was filtered to remove the impurities and was selectively coated on a liquid crystal polymer film, a polyethylene terephthalate film (PET film) or a polyimide film, followed by heating and baking at 100° C. to 170° C. for 20 to 40 minutes to form a resin film. For example, the resin composition from each embodiment may be coated on a copper foil to uniformly adhere the resin composition thereon, followed by heating and baking at a proper temperature to obtain the resin film (also known as a copper-clad resin film).

In one embodiment, for example, the article made from the resin composition disclosed herein may be a laminate, which comprises at least two metal foils and at least one insulation layer disposed between the metal foils, wherein the insulation layer is made by melting and sintering the resin composition of the plastic sheet or resin film at high temperature and high pressure. A suitable lamination temperature may be for example between 350° C. and 390° C., preferably between 360° C. and 380° C., and a lamination time may be 60 to 180 minutes, preferably 90 to 120 minutes. A suitable lamination pressure may be for example between 1500 and 2500 psi, and the laminator has to be filled with nitrogen during lamination to prevent the copper foil from being oxidized at high temperature. The metal foil may contain copper, aluminum, nickel, platinum, silver, gold or alloy thereof, such as a copper foil. In a preferred embodiment, the laminate is a copper-clad laminate.

In one embodiment, for example, the laminate may be further processed by conventional build-up or trace formation processes to make a printed circuit board.

In one embodiment, the resin composition disclosed herein may achieve improvement in one or more of the following properties of the article: dielectric constant, dissipation factor, X-axis coefficient of thermal expansion, weight loss percentage, tensile strength and comparative tracking index.

For example, articles made from the resin compositions according to the present disclosure may achieve one, more or all of the following properties:

a dielectric constant at 10 GHz as measured by reference to JIS C2565 of less than or equal to 3.15, such as between 2.73 and 3.15;

a dissipation factor as measured by reference to JIS C2565 at 10 GHz of less than or equal to 0.0015, such as between 0.0009 and 0.0015;

an X-axis coefficient of thermal expansion as measured by reference to IPC-TM-650 2.4.24.5 of less than or equal to 30 ppm/° C., such as between 15 ppm/° C. and 30 ppm/° C.;

a weight loss percentage of less than or equal to 2.5%, such as between 1.3% and 2.5%;

a tensile strength as measured by reference to ASTM D3039 of greater than or equal to 700 MPa, such as between 700 MPa and 1370 Mpa or between 900 MPa and 1370 MPa; and a comparative tracking index as measured by reference to ASTM D3638 of greater than or equal to 600 V.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

30D: tetrafluoroethylene homopolymer, product name DISP 30, having an average particle size of 0.22 μm and a solid content of 60%, available from Chemours Company.

335D: copolymer of tetrafluoroethylene and perfluoroalkyl vinyl ether, product name PFAD 335D, having an average particle size of 0.20 μm and a solid content of 60%, available from Chemours Company.

KX-1: butyral copolymer of the present disclosure, wherein l=247, m=370, n=2462, having a hydroxyl group content of 80 mol %, available from Sekisui Chemical (Taiwan) Co., Ltd.

KW-1: butyral copolymer of the present disclosure, wherein l=48, m=58, n=418, having a hydroxyl group content of 80 mol %, available from Sekisui Chemical (Taiwan) Co., Ltd.

KW-10: butyral copolymer of the present disclosure, wherein l=43, m=64, n=422, having a hydroxyl group content of 80 mol %, available from Sekisui Chemical (Taiwan) Co., Ltd.

BL-1: butyral copolymer of the present disclosure, wherein l=111, m=6, n=66, having a hydroxyl group content of 36 mol %, available from Sekisui Chemical (Taiwan) Co., Ltd.

BM-1: butyral copolymer of the present disclosure, wherein l=236, m=12, n=128, having a hydroxyl group content of 34 mol %, available from Sekisui Chemical (Taiwan) Co., Ltd.

BL-5: butyral copolymer of the present disclosure, wherein l=200, m=14, n=57, having a hydroxyl group content of 21 mol %, available from Sekisui Chemical (Taiwan) Co., Ltd.

PVB: polyvinyl butyral, not containing a hydroxyl group, commercially available.

BMI-70: bis(3-ethyl-5-methyl-4-maleimidophenyl)methane, available from K.I Chemical Industry Co., Ltd.

SC-2050: spherical silica, available from Admatechs.

ABN: sintered body formed by aluminum nitride and boron nitride, product name ABN-020, available from Vast Applied Material Technology Corporation.

$TiO_2$: titanium dioxide, product name HT0210, available from Prior Company Limited.

212M: nonionic fluorine-containing surfactant, product name Ftergent 212M, available from Neos.

FC-4430: nonionic polymeric fluorine-containing surfactant, available from 3M.

Deionized water: commercially available.

NMP: N-methyl-pyrrolidone, commercially available.

MEK: methyl ethyl ketone, commercially available.

7A: tetrafluoroethylene homopolymer solid powder, having an average particle size of 38 μm, available from Chemours Company.

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 | E6 |
|---|---|---|---|---|---|---|---|
| fluorine-containing compound | 30D | 100 | 100 | 100 | | 100 | 100 |
| | 335D | | | | 100 | | |
| butyral copolymer | KX-1 | 3.5 | | | 3.5 | 2 | 6 |
| | KW-1 | | 3.5 | | | | |
| | KW-10 | | | 3.5 | | | |
| | BL-1 | | | | | | |
| | BM-1 | | | | | | |
| | BL-5 | | | | | | |
| polyvinyl butyral | PVB | | | | | | |
| maleimide | BMI-70 | | | | | | |
| inorganic filler | SC-2050 | 80 | 80 | 80 | 80 | 80 | 80 |
| | ABN | | | | | | |
| | $TiO_2$ | | | | | | |
| surfactant | 212M | 3 | 3 | 3 | 3 | 3 | 3 |
| | FC-4430 | | | | | | |
| solvent | deionized water | 200 | 200 | 200 | 200 | 200 | 200 |
| | NMP | | | | | | |
| | MEK | | | | | | |
| additive | 7A | 5 | 5 | 5 | 5 | 5 | 5 |

| Property | Unit | E1 | E2 | E3 | E4 | E5 | E6 |
|---|---|---|---|---|---|---|---|
| dielectric constant | — | 2.91 | 2.85 | 2.91 | 2.93 | 2.91 | 2.98 |
| dissipation factor | — | 0.0012 | 0.0013 | 0.0014 | 0.0013 | 0.0012 | 0.0014 |
| X-CTE | ppm/° C. | 17 | 16 | 16 | 19 | 17 | 18 |
| weight loss percentage | % | 1.5 | 2.1 | 2.3 | 1.7 | 2.4 | 1.3 |
| tensile strength | MPa | 1200 | 1000 | 1000 | 900 | 1150 | 1340 |
| CTI | V | ≥600 | ≥600 | ≥600 | ≥600 | ≥600 | ≥600 |

TABLE 2

Resin compositions of Examples (in part by weight) and test results

| Component | Name | E7 | E8 | E9 | E10 | E11 | E12 |
|---|---|---|---|---|---|---|---|
| fluorine-containing compound | 30D | 100 | 100 | 100 | 100 | 100 | 100 |
| | 335D | | | | | | |
| butyral copolymer | KX-1 | 3.5 | 3.5 | 3.5 | | | |
| | KW-1 | | | | | | |
| | KW-10 | | | | | | |
| | BL-1 | | | | 3.5 | | |
| | BM-1 | | | | | 3.5 | |
| | BL-5 | | | | | | 3.5 |
| polyvinyl butyral | PVB | | | | | | |
| maleimide | BMI-70 | | | | | | |
| inorganic filler | SC-2050 | 50 | 110 | 80 | 80 | 80 | 80 |
| | ABN | | | | | | |
| | $TiO_2$ | | | | | | |
| surfactant | 212M | 3 | 3 | | 3 | 3 | 3 |
| | FC-4430 | | | | | | |
| solvent | deionized water | 200 | 200 | 200 | 200 | 200 | 200 |
| | NMP | | | | | | |
| | MEK | | | | | | |
| additive | 7A | 5 | 5 | 5 | 5 | 5 | 5 |

| Property | Unit | E7 | E8 | E9 | E10 | E11 | E12 |
|---|---|---|---|---|---|---|---|
| dielectric constant | — | 2.97 | 2.99 | 2.99 | 2.95 | 2.95 | 2.95 |
| dissipation factor | — | 0.0013 | 0.0015 | 0.0015 | 0.0011 | 0.0011 | 0.0009 |
| X-CTE | ppm/° C. | 20 | 16 | 17 | 19 | 17 | 17 |
| weight loss percentage | % | 1.5 | 1.6 | 1.5 | 2.4 | 2.4 | 2.5 |
| tensile strength | MPa | 1050 | 1270 | 1250 | 1020 | 1130 | 1230 |
| CTI | V | ≥600 | ≥600 | ≥600 | ≥600 | ≥600 | ≥600 |

TABLE 3

Resin compositions of Examples (in part by weight) and test results

| Component | Name | E13 | E14 | E15 | E16 | E17 | E18 |
|---|---|---|---|---|---|---|---|
| fluorine-containing compound | 30D | 100 | 100 | 100 | 90 | 90 | 70 |
| | 335D | | | | 10 | 10 | 30 |
| butyral copolymer | KX-1 | 3.5 | 3.5 | 3.5 | 0.5 | | 1 |
| | KW-1 | | | | 0.5 | 1.5 | |
| | KW-10 | | | | 0.75 | | 0.5 |
| | BL-1 | | | | 0.5 | | 0.75 |
| | BM-1 | | | | 0.25 | 0.5 | |
| | BL-5 | | | | 0.25 | 0.5 | |
| polyvinyl butyral | PVB | | | | | | |
| maleimide | BMI-70 | | | | | | |
| inorganic filler | SC-2050 | 80 | 20 | 150 | 38 | 42 | 34 |
| | ABN | | | | 32 | 36 | 28 |
| | $TiO_2$ | | | | 35 | 32 | 53 |
| surfactant | 212M | 3 | 3 | 3 | 1 | 5 | 2 |
| | FC-4430 | | | | 1 | 4 | 3 |
| solvent | deionized water | 200 | 200 | 200 | 150 | 250 | 220 |
| | NMP | | | | | | 15 |
| | MEK | | | | | | 10 |
| additive | 7A | | 5 | 5 | 3 | 8 | 7 |

| Property | Unit | E13 | E14 | E15 | E16 | E17 | E18 |
|---|---|---|---|---|---|---|---|
| dielectric constant | — | 2.91 | 3.03 | 3.15 | 2.73 | 2.75 | 2.74 |
| dissipation factor | — | 0.0013 | 0.0015 | 0.0014 | 0.0010 | 0.0011 | 0.0011 |
| X-CTE | ppm/° C. | 18 | 30 | 15 | 17 | 18 | 18 |
| weight loss percentage | % | 1.6 | 1.4 | 1.9 | 1.3 | 1.4 | 1.3 |
| tensile strength | MPa | 700 | 990 | 1370 | 1140 | 1280 | 1200 |
| CTI | V | ≥600 | ≥600 | ≥600 | ≥600 | ≥600 | ≥600 |

TABLE 4

Resin compositions of Comparative Examples (in part by weight) and test results

| Component | Name | C1 | C2 | C3 | C4 |
|---|---|---|---|---|---|
| fluorine-containing compound | 30D | 100 | 100 | 100 | 100 |
| | 335D | | | | |
| butyral copolymer | KX-1 | | | | |
| | KW-1 | | | | |
| | KW-10 | | | | |
| | BL-1 | | | | |
| | BM-1 | | | | |
| | BL-5 | | | | |
| polyvinyl butyral | PVB | 3.5 | 3.5 | 3.5 | 3.5 |
| maleimide | BMI-70 | | | 5 | 5 |
| inorganic filler | SC-2050 | 80 | 80 | 80 | 80 |
| | ABN | | | | |
| | $TiO_2$ | | | | |
| surfactant | 212M | 3 | 3 | 3 | 3 |
| | FC-4430 | | | | |
| solvent | deionized water | 200 | | | 200 |
| | NMP | | 100 | 120 | |
| | MEK | | 100 | 80 | |
| additive | 7A | 5 | 5 | 5 | 5 |

| Property | Unit | C1 | C2 | C3 | C4 |
|---|---|---|---|---|---|
| dielectric constant | — | 3.02 | unable to form a sample | unable to form a sample | 3.40 |
| dissipation factor | — | 0.0015 | | | 0.0046 |
| X-CTE | ppm/° C. | 20 | | | 28 |
| weight loss percentage | % | 5.8 | | | 6.2 |
| tensile strength | MPa | 600 | | | 1400 |
| CTI | V | ≥600 | | | 400 |

TABLE 5

Resin compositions of Comparative Examples (in part by weight) and test results

| Component | Name | C5 | C6 | C7 | C8 |
|---|---|---|---|---|---|
| fluorine-containing compound | 30D | 100 | 100 | 100 | 100 |
| | 335D | | | | |
| butyral copolymer | KX-1 | | 12 | 1 | 8 |
| | KW-1 | | | | |
| | KW-10 | | | | |
| | BL-1 | | | | |
| | BM-1 | | | | |
| | BL-5 | | | | |
| polyvinyl butyral | PVB | | | | |
| maleimide | BMI-70 | | | | |
| inorganic filler | SC-2050 | 80 | 80 | 80 | 80 |
| | ABN | | | | |
| | $TiO_2$ | | | | |
| surfactant | 212M | 3 | 3 | 3 | 3 |
| | FC-4430 | | | | |
| solvent | deionized water | 200 | 200 | 200 | 200 |
| | NMP | | | | |
| | MEK | | | | |
| additive | 7A | 5 | 5 | 5 | 5 |

| Property | Unit | C5 | C6 | C7 | C8 |
|---|---|---|---|---|---|
| dielectric constant | — | 2.91 | 3.18 | 3.05 | 3.15 |
| dissipation factor | — | 0.0012 | 0.0019 | 0.0012 | 0.0017 |
| X-CTE | ppm/° C. | 18 | 21 | 18 | 21 |
| weight loss percentage | % | 75.0 | 1.0 | 4.3 | 1.1 |
| tensile strength | MPa | 1200 | 1080 | 1000 | 1345 |
| CTI | V | 550 | 350 | ≥600 | 400 |

Samples (specimens) for the properties measured above were prepared as described below and tested and analyzed under specified conditions below.

1. Copper-clad resin film: Chemical reagents in the resin composition from each Example (Table 1 to Table 3) or each Comparative Example (Table 4 and Table 5) were individually well mixed and stirred homogeneously in a stirred tank to obtain a dispersion, which was filtered to remove the impurities and was coated on a copper foil (high temperature elongation copper foil (HTE copper foil) with a thickness of 35 μm) to uniformly adhere the resin composition thereon, followed by heating and baking at 100° C. to 170° C. for 30 minutes to obtain a copper-clad resin film, which contains one resin film layer and one copper foil layer, wherein the thickness of the resin film layer is 62.5 μm.
2. Copper-containing laminate (formed by laminating two copper-clad resin films): Two copper-clad resin films obtained as described above were prepared and stacked, wherein two resin film layers were adjacent to each other, and two outer sides were the copper foil layers, followed by lamination and curing for 1.5 hours in a high temperature laminator filled with nitrogen with a lamination pressure of 2000 psi and a lamination temperature of 360° C. to 380° C. to form a copper-containing laminate (formed by laminating two copper-clad resin films).
3. Copper-free laminate (formed by laminating two copper-clad resin films): Each aforesaid copper-containing laminate (formed by laminating two copper-clad resin films) was etched to remove the copper foils on both sides to obtain a copper-free laminate (formed by laminating two copper-clad resin films).

For each sample, test items and test methods are described below:

Dielectric Constant (Dk)

The copper-free laminate (formed by laminating two copper-clad resin films) sample was subject to dielectric constant measurement. Each specimen was measured by using a microwave dielectrometer (available from AET Corp.) by reference to JIS C2565 at room temperature (about 25° C.) and under 10 GHz frequency. Lower dielectric constant represents better dielectric properties of the sample. Under a 10 GHz frequency, for a Dk value of less than 3.15, a difference in Dk value of less than 0.1 represents no substantial difference in dielectric constant in different laminates, and a difference in Dk value of greater than or equal to 0.1 represents a substantial difference (i.e., significant technical difficulty) in dielectric constant in different laminates.

Dissipation Factor (Df)

The copper-free laminate (formed by laminating two copper-clad resin films) was subject to dissipation factor measurement. Each specimen was measured by using a microwave dielectrometer (available from AET Corp.) by reference to JIS C2565 at room temperature (about 25° C.) and under 10 GHz frequency. Lower dissipation factor represents better dielectric properties of the sample. Under a 10 GHz frequency, for a Df value of less than 0.0015, a difference in Df of less than 0.0002 represents no substantial difference in dissipation factor in different laminates, and a difference in Df value of greater than or equal to 0.0002 represents a substantial difference (i.e., significant technical difficulty) in dissipation factor in different laminates.

X-Axis Coefficient of Thermal Expansion (X-CTE)

The copper-free laminate (formed by laminating two copper-clad resin films) sample was tested by thermal mechanical analysis (TMA) during the measurement of X-axis coefficient of thermal expansion. The aforesaid copper-free laminate was cut into a sample with a length of 24 mm and a width of 3 mm. Each sample was heated from 35° C. to 350° C. at a heating rate of 10° C./minute and then subject to the measurement of the X-axis coefficient of thermal expansion (ppm/° C.) in a temperature range (designated as α1) of 40° C. to 250° C. by reference to IPC-TM-650 2.4.24.5, wherein the X-axis coefficient of thermal expansion described herein refers to the measurement of coefficient of thermal expansion of the sample in X-axis direction. Lower X-axis coefficient of thermal expansion represents a better dimensional change property. A difference in X-axis coefficient of thermal expansion of greater than or equal to 1 ppm/° C. represents a substantial difference (i.e., significant technical difficulty) in X-axis coefficient of thermal expansion in different laminates.

Weight Loss Percentage

A copper-clad resin film described above and a high temperature elongation copper foil (HTE copper foil) with a thickness of 35 μm were chosen, and the copper-clad resin film was cut into a sample with a length of 5 inch, a width of 5 inch and a thickness of 62.5 μm; the weight of the sample was measured as Weight A. Next, the sample and the HTE copper foil were stacked, wherein the resin film layer was adjacent to the shiny side of the copper foil, with copper foil on both sides. Two 5 kg standard weights (a total of 10 kg standard weights) were superimposed on one side of the copper foil, and the standard weights and the HTE copper foil were removed after 30 minutes; the weight of the sample was measured as Weight B. Weight loss percentage is defined as [(A−B)/A]*100%. A difference in weight loss percentage of greater than or equal to 2% represents a substantial difference (i.e., significant technical difficulty) in weight loss percentage in different laminates.

Tensile Strength

The copper-free laminate (formed by laminating two copper-clad resin films) was chosen and cut into a sample with a length of 250 cm and a width of 25 cm. By reference to the processes of ASTM D3039, a tensile strength tester was used to measure the tensile strength (MPa) of each sample. A difference in tensile strength of greater than or equal to 50 MPa represents a substantial difference (i.e., significant technical difficulty) in tensile strength in different laminates.

Comparative Tracking Index (CTI)

The copper-free laminate (formed by laminating two copper-clad resin films) sample with a size of 100 mm*100 mm*3 mm was tested by reference to the processes described in ASTM D3638. During the test, a 100V voltage was applied to the sample on the tester, followed by the addition of one drop of 0.1 wt % ammonium chloride aqueous solution every 30 seconds until tracking was formed, and the total number of drops added before tracking was recorded. If tracking was not formed after the addition of 50 drops, the voltage was increased by 50V to 150V to test and record the tolerable voltage value of the sample. A voltage increment of 50V was applied gradually, and the voltage test range was from 100V to 600V. If the voltage test at 600V does not result in failure, the test result is designated as ≥600V, which represents that the comparative tracking index does not result in failure at 600V to 700V or at 600V to 650V. The unit used in the comparative tracking index test is volt (abbreviated as "V"). A difference in comparative tracking index of greater than or equal to 50 V represents a substantial difference (i.e., significant technical difficulty) in comparative tracking index in different laminates.

The following observations can be made from Table 1 to Table 5.

A comparison of Examples E1 to E3 and E10 to E12 and Comparative Example C1 shows that if the resin composition comprises a butyral copolymer containing a unit of Formula (I), a unit of Formula (II) and a unit of Formula (III), compared with using polyvinyl butyral, at least one of the following properties can be improved, including weight loss percentage and tensile strength.

In contrast to Examples E5 and E6, if the amount of a butyral copolymer containing a unit of Formula (I), a unit of Formula (II) and a unit of Formula (III) in the resin composition is not within the range of 2 parts by weight to 6 parts by weight (such as 0 part by weight, 1 part by weight, 8 parts by weight or 12 parts by weight), such as Comparative Examples C5 to C8, at least one of desirable improvement in properties including dissipation factor, weight loss percentage and comparative tracking index was not achieved.

Overall, the resin composition of the present disclosure can achieve at the same time a dielectric constant of less than or equal to 3.15, a dissipation factor of less than or equal to 0.0015, an X-axis coefficient of thermal expansion of less than or equal to 30 ppm/° C., a weight loss percentage of less than or equal to 2.5%, a tensile strength of greater than or equal to 700 MPa, and a comparative tracking index of greater than or equal to 600 V.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   100 parts by weight of a fluorine-containing compound, which comprises tetrafluoroethylene homopolymer, perfluoroalkoxy alkane polymer or a combination thereof, wherein the tetrafluoroethylene homopolymer is tetrafluoroethylene homopolymer powder dispersed in aqueous solution, and the perfluoroalkoxy alkane polymer is perfluoroalkoxy alkane polymer powder dispersed in aqueous solution;
   2 parts by weight to 6 parts by weight of a butyral copolymer, which comprises a unit of Formula (I), a unit of Formula (II) and a unit of Formula (III), wherein l is an integer of 40 to 250, m is an integer of 5 to 380, n is an integer of 55 to 2500, and wherein the butyral copolymer has a content of hydroxyl group of 21 mol % to 80 mol %;

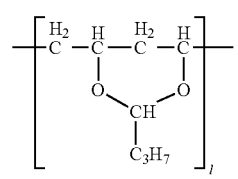

Formula (I)

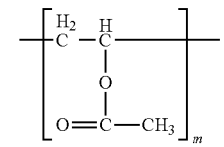

Formula (II)

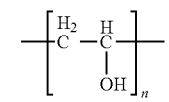

Formula (III)

and 20 parts by weight to 150 parts by weight of an inorganic filler.

2. The resin composition of claim 1, wherein the tetrafluoroethylene homopolymer powder has an average particle size of 0.15 μm to 0.40 μm, and the perfluoroalkoxy alkane polymer powder has an average particle size of 0.15 μm to 0.5 μm.

3. The resin composition of claim 2, further comprising solid powder of tetrafluoroethylene homopolymer of average particle size of 20 μm to 50 μm.

4. The resin composition of claim 3, wherein, relative to 100 parts by weight of the fluorine-containing compound, the solid powder of tetrafluoroethylene homopolymer is 3 parts by weight to 8 parts by weight.

5. The resin composition of claim 1, wherein the perfluoroalkoxy alkane polymer comprises a copolymer of tetrafluoroethylene and perfluoroalkyl vinyl ether.

6. The resin composition of claim 1, wherein the inorganic filler comprises silica, titanium dioxide, sintered body formed by aluminum nitride and boron nitride or a combination thereof.

7. The resin composition of claim 1, further comprising surfactant, silane coupling agent, impregnation aid, solvent or a combination thereof.

8. An article comprising a plastic sheet, a resin film, a laminate or a printed circuit board, wherein the article is made from a resin composition comprising:

100 parts by weight of a fluorine-containing compound, which comprises tetrafluoroethylene homopolymer, perfluoroalkoxy alkane polymer or a combination thereof;

2 parts by weight to 6 parts by weight of a butyral copolymer, which comprises a unit of Formula (I), a unit of Formula (II) and a unit of Formula (III), wherein l is an integer of 40 to 250, m is an integer of 5 to 380, n is an integer of 55 to 2500, and wherein the butyral copolymer has a content of hydroxyl group of 21 mol % to 80 mol %,

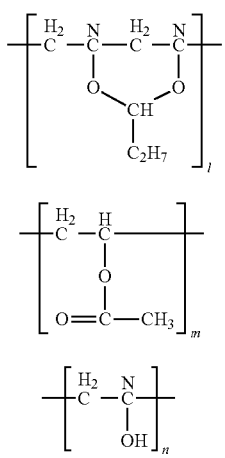

Formula (I)

Formula (II)

Formula (III)

and
20 parts by weight to 150 parts by weight of an inorganic filler,
wherein the tetrafluoroethylene homopolymer is tetrafluoroethylene homopolymer powder of average particle size of 0.15 μm to 0.40 μm dispersed in aqueous solution, and the perfluoroalkoxy alkane polymer is perfluoroalkoxy alkane polymer powder of average particle size of 0.15 μm to 0.50 82 m dispersed in aqueous solution, and the resin composition further comprises solid powder of tetrafluoroethylene homopolymer of average particle size of 20 μm to 50 μm.

9. The article of claim 8, having a dielectric constant as measured by reference to JIS C2565 at 10 GHz of less than or equal to 3.15.

10. The article of claim 8, having a dissipation factor as measured by reference to JIS C2565 at 10 GHz of less than or equal to 0.0015.

11. The article of claim 8, having an X-axis coefficient of thermal expansion as measured by reference to IPC-TM-650 2.4.24.5 of less than or equal to 30 ppm/° C.

12. The article of claim 8, having a weight loss percentage of less than or equal to 2.5%.

13. The article of claim 8, having a tensile strength as measured by reference to ASTM D3039 of greater than or equal to 700 MPa.

14. The article of claim 8, having a comparative tracking index as measured by reference to ASTM D3638 of greater than or equal to 600 V.

* * * * *